United States Patent [19]

Limb

[11] Patent Number: 5,111,456
[45] Date of Patent: May 5, 1992

[54] APPARATUS AND METHOD FOR COMMUNICATING DATA BETWEEN A PLURALITY OF STATIONS

[75] Inventor: John O. Limb, Los Gatos, Calif.

[73] Assignee: Hewlett-Packard Company, Palo Alto, Calif.

[21] Appl. No.: 567,285

[22] Filed: Aug. 14, 1990

[30] Foreign Application Priority Data

Aug. 16, 1989 [EP] European Pat. Off. ............ 89308325

[51] Int. Cl.$^5$ ............................................. H04J 3/02
[52] U.S. Cl. .................................. 370/85.1; 370/85.8; 370/85.9; 370/95.2
[58] Field of Search ...................... 370/85.1, 85.9, 85.8, 370/95.2; 340/825.5, 825.51

[56] References Cited

U.S. PATENT DOCUMENTS

| | | | |
|---|---|---|---|
| 4,161,786 | 7/1979 | Hopkins et al. | 364/900 |
| 4,532,626 | 7/1985 | Flores et al. | 370/85.9 |
| 4,550,401 | 10/1985 | Spears | 370/85.9 |
| 4,581,735 | 4/1986 | Flamm et al. | 370/85.9 |
| 4,794,592 | 12/1988 | Caine et al. | 370/85.1 |
| 4,922,244 | 5/1990 | Hullett et al. | 370/85.11 |

FOREIGN PATENT DOCUMENTS

0147994  12/1984  European Pat. Off. .

OTHER PUBLICATIONS

IEEE Infocom, New Orleans, Mar. 1988, pp. 805-812, D.H.C. Du et al., "A New Access Protocol for Uni-Directional Twin-Bus Architectures".

Bell System Technical Journal, vol. 61, No. 7, Part 1, Sep. 1982, pp. 1413-1440, J.O. Limb et al., "Description of Fastnet-A Uni-Directional Local Area Communications Network".

*Primary Examiner*—Douglas W. Olms
*Assistant Examiner*—Temesghen Samuel
*Attorney, Agent, or Firm*—Woodcock, Washburn, Kurtz, Mackiewicz & Norris

[57] ABSTRACT

A communications system has a plurality of stations ($S_1$, $S_2$ ... $S_N$) interconnected by a pair of lines (10,11) so that one line (10) permits the stations ($S_1$, $S_2$ ... $S_N$) to transmit in one direction and the other line (111) permits transmission in the other direction. Frames each having a control field and a data field pass down the lines (10,11) and each station ($S_1$, $S_2$ ... $S_N$) can write a packet of data to any frame in which the data field is empty. This is signalled by a busy bit in the control field. The stations ($S_1$, $S_2$ ... $S_N$) are arranged to write data packets in cycles. The commencement of such a cycle for writing to signals on one line (10,11) is determined by a signal on the other line (11,10). That signal may be constituted by a suitable reset bit in the control field of a frame. Preferably, once the cycle of a station ($S_1$, $S_2$ ... $S_N$) commences, it is temporarily inhibited from being recommenced by a reset signal on the other line (11,10).

21 Claims, 4 Drawing Sheets

APPARATUS AND METHOD FOR COMMUNICATING DATA BETWEEN A PLURALITY OF STATIONS

BACKGROUND OF THE INVENTION

The present invention relates to a communications system, and in particular to a multiple access digital communications system between a plurality of stations and a method of communicating data in such a system.

Figure 1:
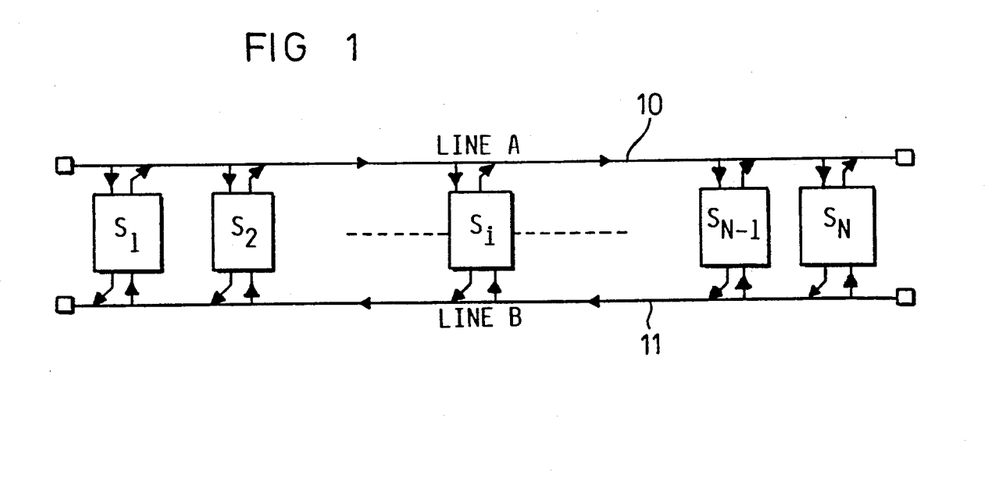
FIG. 1 shows a communications system which may be operated according to the present invention.

Consider a plurality of stations, such as digital computers. These computers may be interconnected to form a chain as shown in FIG. 1 of the accompanying drawings, in which each Station $S_1, S_2 \ldots S_N$ is connected to a pair of lines 10, 11, with one line 10 (line A) carrying traffic in one direction and the other line 11 (line B) carrying traffic in the other direction. If a station such as station $S_1$ wants to transmit data to a station further down the chain (i.e. to the right in FIG. 1) it can do this via line 10, and if it wishes to transmit data to a station higher up the chain (i.e. to the left in FIG. 1) it can transmit data via line 11. Equally, station $S_i$ receives data from stations higher up the chain via line 10 and from stations lower down the chain via line 11.

In order for such a system to operate efficiently, and for data collisions to be avoided, it is necessary to have a suitable protocol for transmitting data between the stations, and a known protocol for achieving this is discussed in U.S. Pat. No. 4,532,626.

In the protocol discussed in U.S. Pat. No. 4,532,626 the system operates by having the first station on each line (i.e. station $S_i$ for line A and station $S_N$ for line B) act as a "head" station governing the generation of signals defining logical multi-bit frames that pass down the line and are usable by the stations to carry data. Each frame comprises an access control field and a data field. The operation of the system will now be discussed in more detail with reference to FIG. 2 of the accompanying drawings. In the following description it is assumed that the frames under consideration are passing down line A, but of course the situation is exactly analogous for line B.

The system operates cyclically in transporting data over line A in frames. As will become clear, within each system cycle, each station goes through a cycle of writing data to the frames. When all stations have completed their writing cycle, the system cycle terminates and new system and station cycles are thereafter commenced.

For the first frame in a system cycle, the head station sets the first bit of the access control field (which may thus be considered as a start bit), and the frame is then passed down the line. When the stations detect that start bit, they start their respective writing cycles and may thereafter seize (i.e. pass data in) any subsequent frame in which the data field is empty on arrival at that station. Each station transmits data by filling the data field of a seized frame with any one of the data packets which the station is to transmit (each data packet carries addressing information as well as the data to be passed). At the same time that the station fills the data field with a data packet the station sets a "busy" bit in the access control field of the frame to indicate to subsequent stations that the data field has been filled.

Thus, consider station $S_i$. After initialization by the first frame from station $S_i$ in which the start bit is set, the station $S_i$ monitors the busy bit of subsequent frames. Where the busy bit of a frame is set, the station $S_i$ knows that a station further up the line has already filled the data field of that frame, and therefore the station $S_i$ cannot use that frame to pass information down the line. If, however, a frame arrives with the busy bit not set, the station $S_i$ can then fill the data field for passing data further down the line, and set the busy bit. Each station is arranged such that during each of its writing cycles it can transmit up to a predetermined maximum number of packets. System operation continues until all the stations have completed their writing cycles, that is, until they have transmitted their data packets, each up to their maximum permitted number of packets. When this happens, the next frame to pass down the line reaches the tail station $S_N$ with the busy bit empty. The tail station $S_N$ then realizes that the end of the system cycle has arrived, and passes a signal up the other line (i.e. line B) by setting an "end" bit in the access control field of the signal shown in FIG. 2. When that end bit reaches the head station $S_1$, station $S_1$ knows that all the stations down line A have completed their writing cycles and a new frame is sent out with the start bit set to recommence a system cycle for line A.

Figure 3:
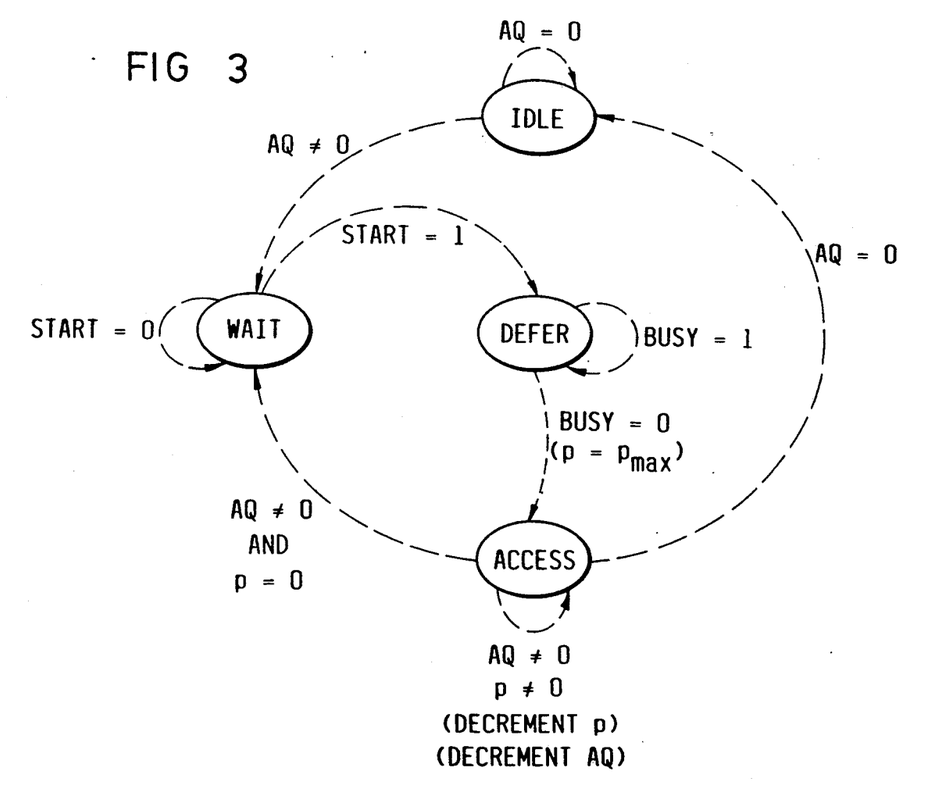
FIG. 3 shows schematically the operation of a prior art communications system, and has already been discussed.

Thus, the operation of each station is as shown in FIG. 3. Where the station had no data packets to send, this is recorded in an appropriate memory and is indicated in FIG. 3 by the symbol AQ=0. This is known as the "idle" mode of the station. Where the station has data packets to send (i.e. AQ=0), the station moves into the "wait" mode in which it waits for an initializing signal from the head station, i.e. a signal in which the start bit has been set. When this happens, the station moves into the "defer" mode. In this mode each frame arriving at the station is checked to see if the busy bit is set, and if it is then the station remains in the defer mode. Where, however, the busy bit is not set, the station moves into the "access" mode in which subsequent frames are seized and data packets are transmitted down the line in the data fields of these frames. The station remains in the access mode as the data packets are sent until either data has been input to the predetermined maximum number of packets, in which case the station returns to the wait mode, or all the data packets have been sent so that the station has no more to send, in which case the station returns to the idle mode.

This operation is described as sequential, in that each station is gated so that where the station is already passing data packets to the data fields of frames on the line, any newly arriving data packet which the station determines must be transmitted will have to wait until the next cycle of frames before those newly arrived packets can be transmitted.

It is also possible for some or all the stations to operate in a non-gated mode so that if during a cycle the station has further packets to transmit over and above those already stored at the station at the start of the cycle, then the station can transmit those further packets provided that the total number of packets does not exceed the predetermined maximum number of packets.

Figure 4:
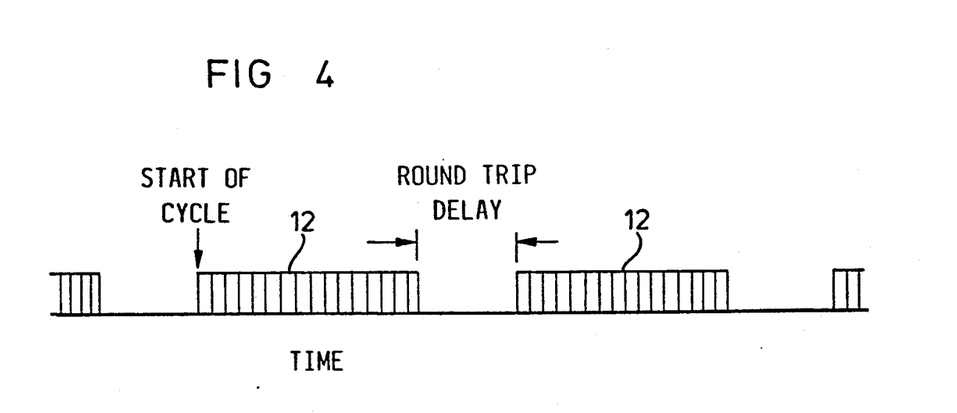
FIG. 4 shows the pattern of cycles in a prior art communications system operating as shown in FIG. 3, and has already been discussed.

The resulting passage of frames is shown generally in FIG. 4, in which it can be seen that when a system cycle starts, the data fields of subsequent frames are filled down the line until all the stations have sent the appropriate number of packets. There is then a delay while an unfilled frame passes down line A to the tail station and a frame with the end bit set passes up line B from the tail station to the head station; thereafter head station restarts a system cycle. There is thus a delay between each group 12 of filled frames passing down the line.

This delay is thus a clear disadvantage of the system proposed in U.S. Pat. No. 4,532,626. The system is effectively not in use for the time it takes for a frame to pass from one end of the chain to the other and back, to indicate the start of a new system cycle.

In an article entitled "Description of Fasnet-A Unidirectional Local Area Communications Network", by J. O. Limb and C. Flores, in "The Bell System Technical Journal, Vol. 61, No. 7, Sep. 1982," the system proposed in U.S. Pat. No. 4,532,626 was discussed. In that article, on page 1428, there is the proposal that the system of U.S. Pat. No. 4,532,626 can be modified to allow some transmission during the delay time shown in FIG. 3. The proposal is that when any station detected a frame passing from the end station to the head station to signal the end of a system cycle (i.e. a frame in which the end bit is set as discussed previously), the station can begin transmission into frames on the other line in which the data fields are empty (signalled by the busy bit of the frame not being set). In this proposal, however, this transmission during the delay is only an interim feature, since the passage down one line of a frame in which the start bit is set re-initializes all the stations on that line. Thus, the modification discussed maintained the presence and action of the "head station" in relation to initiating the start of a new cycle.

SUMMARY OF THE INVENTION

The present invention seeks to further simplify the system by reducing the complexity of the signalling, and effectively removing the need for a head station operating in the manner discussed above. To this end, the present invention proposes that the commencement of each station writing cycle is determined by a signal on the other path (line) which resets the station to a new cycle. That reset signal is generated by the tail station on detecting the end of the cycle of the stations.

More particularly, according to one aspect of the present invention, there is provided a communication system having a plurality of stations ($S_1, S_2 \ldots S_N$) sequentially interconnected by two paths which are unidirectional and oppositely directed with respect to each other. Each station ($S_1, S_2 \ldots S_N$) is arranged to write data packets to one of the paths for transmission over the path with that writing being in cycles of up to a predetermined maximum number of packets per cycle. The station ($S_N, S_1$) at the end of the one path is a tail station for that one path and is operative to detect when all of the stations ($S_1, S_2 \ldots S_N$) in that one path have completed their writing cycles, and thereafter to transmit a reset signal on the other of the paths. Each station ($S_1, S_2 \ldots S_N$) is arranged to detect the reset signal and commence a further cycle of writing of packets on the basis of that reset signal.

The article by Limb and Flores discussed above also has a modification in which the function of the tail station is omitted. The modification proposed that, when a station is in the "defer" or "access" mode, it applies a "request" signal to the other line (i.e. not the line on which packet transmission is being considered), and the head station detects each of those request signals. When no such request signals are applied, the head station sends out a "start" signal. This differs from the present invention in that the present invention retains the tail function (since it permits simple signalling as will be described later). The modification discussed by Limb and Flores has the disadvantage that each station must both "read" and "write" on the other line, whereas the present invention involves only "reading" on the other line.

Limb and Flores also discuss a further change to that modified proposal. With the tail station function omitted, it is proposed also to omit the head station function. The stations are then not reset by a signal from the head station, but each station resets on detection that all the stations are not applying a request signal to the other line. Again, this proposal requires each station to both "read" and "write" on the other line and the control required by each station is much more complex than in the present invention.

The present invention thus permits the head station, which needs more complex signalling, to be omitted. In fact, frames that pass down the line may then be further simplified, in that there is no need for the frame to contain a "start bit" as discussed above. However, the frame still needs to contain a busy bit to indicate whether or not the data field of the frame is occupied by a data packet.

The present invention can be used in the case where data is to pass between the stations in one direction only, down one of the paths, and then the only function of the other path is to permit the transmission of a signal to reset the cycles of the stations. However, the system will normally be applied to a two-way arrangement and, more particularly, to one in which frames are generated and passed along both paths with each frame being divided into a control field for carrying the control signals, and a data field for carrying a data packet. In this case, the control field of the frames on one line will normally contain a bit (hereinafter a "reset bit") for indicating to the stations when they are to re-set their cycle for the other path. This may be achieved by the tail station noting when the busy bit of a frame that it receives is not set, and applying a suitable signal to set the reset bit of a frame of the other path, which reset bit resets the cycles of the stations for the original path.

If, however, such an arrangement is used in which the cycles are reset whenever such a reset bit arrives, a further problem may develop.

Consider a number of stations spaced down a pair of lines. Suppose further that each station has reached the end of its cycle, i.e. transmitted all the data it has to transmit up to a predetermined maximum, so that a frame reaches the end station in which the busy bit is not set. That end station then passes a frame to the other line in which the reset bit is set to start re commencement of the cycle. That signal (which for simplicity can be referred to as a "reset signal") then passes up the line. The first station which receives the frame with the reset bit set is then reset so that it begins to transmit more data packets towards the end station in frames whose data fields are empty. The reset signal then passes further up the line, to the next station, which is then reset and so starts filling the data fields of the frames it receives whose data fields are empty.

When those signals arrive at the station nearer the end station, that station will not be able to transmit data, and so will effectively be in a defer mode in which it must delay transmitting packets. If, at this time, further reset signals pass up the line (e.g. because several signals reached the end station with their busy bit not set, and the reset signal corresponds to one of those later signals), the station nearer the end station will have its cycle reset again. Effectively, the station has then got through part of one cycle, and been reset to start another cycle. As will be discussed in more detail later, with reference to a specific example, this can result in some stations transmitting significantly more data packets than other stations, which is undesirable.

To overcome this problem it is proposed that each station has means for temporarily inhibiting recommencement of a cycle by a reset signal after commencement of a cycle by an earlier reset signal. This imposition of a reset delay significantly contributes to a more uniform pattern.

As was mentioned briefly above, the present invention may be used in an arrangement in which data packets are passed only in one direction, but is preferably used in an arrangement in which data packets are passed in two different directions down a pair of paths. In this latter case, each station is arranged to write further data in a plurality of further packets to a corresponding plurality of frames on the other of the paths. The writing of the further data is then in a plurality of further cycles of a further predetermined number of the further packets, and again the commencement of each further cycle may be determined by a further reset signal. That reset signal is then on the original one of the paths. Of course, the predetermined number of packets that a station transmits within a cycle may be the same or different for each of the two paths.

DETAILED DESCRIPTION OF PREFERRED EMBODIMENT

Consider the communication system formed by a plurality of stations $S_1, S_2 \ldots S_N$ connected in a chain as shown in FIG. 1. The stations are, as has been discussed earlier, interconnected by two lines 10, 11. Each line 10, 11, carries traffic, in the form of frames, the two lines 10, 11 carrying traffic in opposite directions. Thus, as before, if a station $S_i$ wants to transmit data to a station further down the chain of stations (i.e. to right in FIG. 1) it can do this via line 10, and if it wishes to transmit data higher up the chain (i.e. to the left in FIG. 1) it can do this via line 11.

In the present system, each station transmits packets of data in a plurality of station writing cycles each of up to a predetermined maximum number of packets. That predetermined number will be referred to herein as $P_{max}$ and will be recorded in a suitable register in the station. $P_{max}$ may be the same or different for each station, and may be the same or different for transmission in opposite directions. In the present invention the start of a cycle (i.e. by the resetting of the register which determines $P_{max}$) is determined by a signal passing on the other line.

Figure 5:
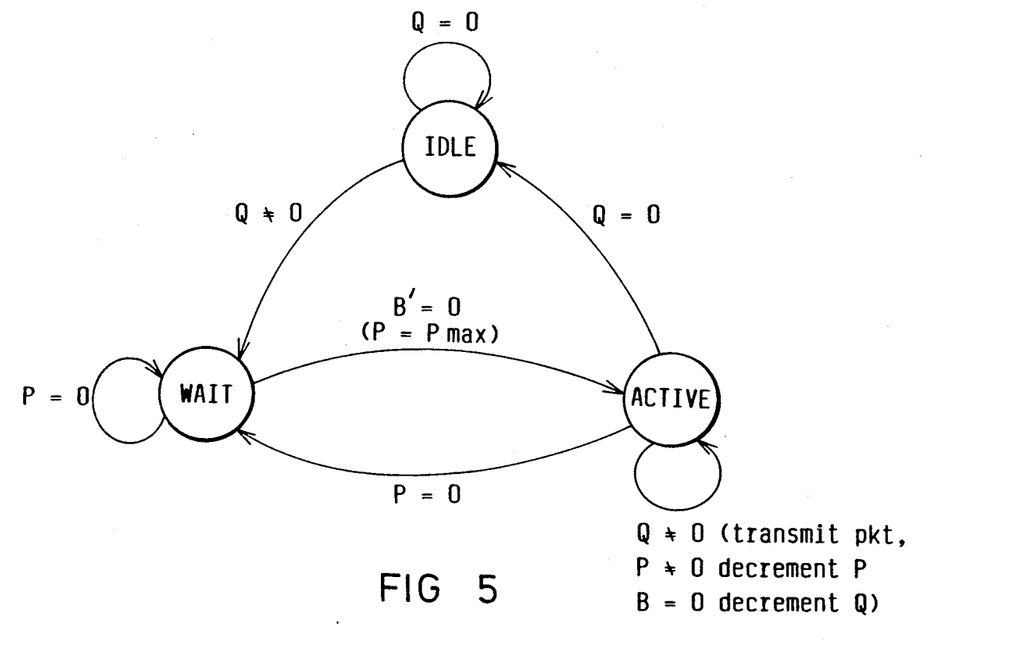
FIG. 5 shows the operation of a communication system according to the present invention.

This will now be discussed with reference to FIG. 5 for a station $S_i$ in FIG. 1. In FIG. 5, the number of packets that a station has to send at any time is indicated by Q.

Firstly, suppose that the station has no packets to send (i.e. Q=0). In this case, the station remains in the "idle" mode. When the station has packets to send (i.e. Q≠0), the station moves into a "wait" mode to await the commencement of a cycle. In that wait mode, the station waits for a reset signal on the other line (i.e. if FIG. 5 is applied to transmission along line 10, the station waits for a reset signal on a line 11, and vice versa). That reset signal is indicted by B'=0 for reasons which will be discussed later. When that reset signal arrives at the station, the cycle register is set to $P_{max}$, and the station moves into the active mode in which it can transmit data. In that active mode, the station will transmit a packet to a frame passing down the line (e.g. line 10) in which the data field is empty. In order for the station to determine whether or not the data field of a given signal is empty, the control field of the frame may contain a busy bit which, when set, indicates that the data field is also filled.

When, in the active mode, the station receives a frame in which the data field is empty, it transmits a packet to that frame, thereby decrementing the number of packets that are to be transmitted (i.e. Q is decremented) and also the number (P) of remaining packets that can be transmitted in the cycle is also decremented. This continues until either Q=0 (in which case all packets have been transmitted) or P=0 in which case the station has ended its cycle. In the case where Q=0, the station returns to the idle mode, whereas when P=0, the station returns to the wait mode to await a further reset signal to restart the cycle. It remains in that wait mode until the register P is reset to $P_{max}$ by the arrival of a reset signal.

It can be seen immediately that the operation of the station is simpler than that of the known arrangement described with reference to FIG. 3, but more importantly the form of the frames has been simplified as will now be discussed with reference to FIG. 6.

Figure 6:
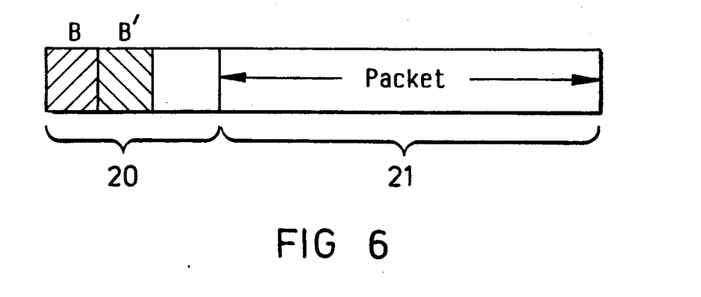
FIG. 6 shows a frame for use in a communication system according to the present invention.

Referring to FIG. 6, a frame for use in a system according to the present invention comprises two parts, a control field 20 and a data field 21. The data field 21 receives data packets from the stations. In order to indicate whether or not the data field 21 is empty, the control field 20 contains a busy bit B which, when set, indicates that the data field 21 is filled. If the system involved transmission only in one direction, that simple signal structure would be sufficient. However, in a two way system as e.g. described with reference to FIG. 1, a frame passing on one line must also contain the reset signal for the other line. This reset signal is indicated by reset bit B' in FIG. 6. When a station detects that the B' reset bit of a control field of one signal is set, this is an indication to reset the cycle register to $P_{max}$ as was described with reference to FIG. 5.

The setting of the reset bit B' is achieved by the end station and the preferred arrangement for achieving this is simple. The output from an end station of a reset signal on one line (e.g. line 11) is triggered by the reception of a frame on the other line (e.g. line 10) in which the busy bit B is not set, and in which the data field is therefore empty. The end station may then simply copy the busy bit B from the received signal on one line into the reset bit B' of the control field of the next signal on the other line. Normally, the polarity of the logic will mean that the busy bit B is treated as set when it is at logic "1", and therefore the reset signal is generated when the busy bit is at logic "0". Since the end station simply copies the busy bit B of one signal into the reset bit B' of the control field 20 of the signal in the other direction, that reset signal is achieved with the reset bit B' at logic "0". However, this is simply a matter of the convention of the logic, and such a logic "0" can still be considered as "setting" the reset bit B', because it will at other times be at logic "1", which will not activate the resetting of the stations, and thus this can be considered as the "unset state".

Figure 2:
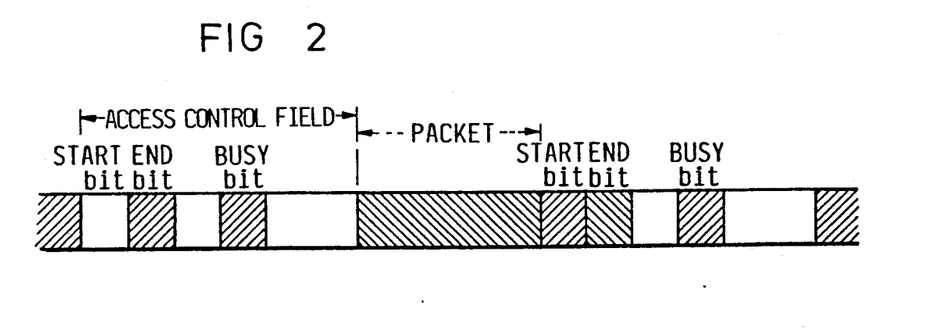
FIG. 2 shows a frame for use in a prior art communication system and has already been discussed.

Thus, it can be seen from FIG. 6 that the structure of the control field of a frame using the present invention is simpler than that of the prior art frame discussed with reference to FIG. 2. The simplicity of the frame means that the structure of the stations may be simplified, thereby achieving a reduction in cost. Furthermore, the gaps between cycles are much shorter than in the known system since the station next to the end station (i.e. station $S_{N-1}$ in FIG. 1) recommences its cycle with a delay corresponding to the time taken for a frame to pass from the end station $S_N$ on line 11 to that station, rather than the time taken for a signal to pass from the end station $S_N$ to the far end of the line (i.e to station $S_1$) and then back down the other line. The delay with the present invention can be very short.

However, there is a further problem with the system, described above. As described, the register determining the number of packets that can be transmitted is reset (i.e. the register is set to $P_{max}$) whenever an appropriate signal passes along the other line. At first sight, this is satisfactory but it turns out that this is not wholly so.

Consider station $S_{N-1}$ in FIG. 1. Suppose that all the stations transmitting down the line 10 have completed a cycle, so that a frame with the busy bit B not set arrives at the end station $S_N$. That end station $S_N$ then sends out a frame on the other line 11 with the reset bit B' set. When that frame arrives at station $S_{N-1}$, it resets the register to $P_{max}$ and the station $S_{N-1}$ may then write data to frames on the line 10 in which the data field is empty.

However, the signal with the reset bit B' filled then passes further up the line to the next station, and in a similar way resets that station. That station then writes data packets to empty data fields of frames on the line 10, and the fact that those data packets have been filled before arriving at station $S_{N-1}$ means that the station $S_{N-1}$ cannot transmit data packets to those frames. If, during this time, another frame is received by station $S_{N-1}$ on line 11 with the reset bit B' set, the station will again reset the register to $P_{max}$. Since the station $S_{N-1}$ will not have finished its cycle, the station then effectively operates on a cycle which the number of packets that may be transmitted is greater than $P_{max}$.

The number of extra packets will depend on the spacing of the stations. Suppose there is a gap corresponding to two frame lengths to the next station upstream (i.e. to the left in FIG. 1) from station $S_{N-1}$. The first arriving frame in which the reset bit B' is set will set the register to $P_{max}$ and the station will transmit two packets only on line 10 assuming the station $S_{N-1}$ has packets to transmit. Then, the frame with the reset bit B' set will pass to the next upstream station and that upstream station will be reset and start writing in the empty packets passing down the line 10. Then, if a later frame with the reset bit B' set passes the station $S_{N-1}$ on line 11, the register will be reset to $P_{max}$. Hence the cycle effectively involves a total of $P_{max}$ plus 2 packets.

If there are a large number of stations on the line relative to its length, this problem is not excessive. However, this is not normally the case. Suppose there are twenty stations randomly placed along a line whose length corresponds to 100 frame lengths. Then, there is a high chance of a gap of 8 frame lengths between one station and another. However, that station will then transmit $P_{max}$ plus 8 frames per cycle. If $P_{max}$ were set to 16 (a typical figure), then that station would transmit 50% more data than a station that was close to another station. Since one of the aims of the protocol is to ensure that the stations transmit the correct number of packets per cycle, and so that "fairness" can be achieved between the stations, it can be seen that this is overridden if reset occurs whenever a station receives a reset signal.

Figure 7:
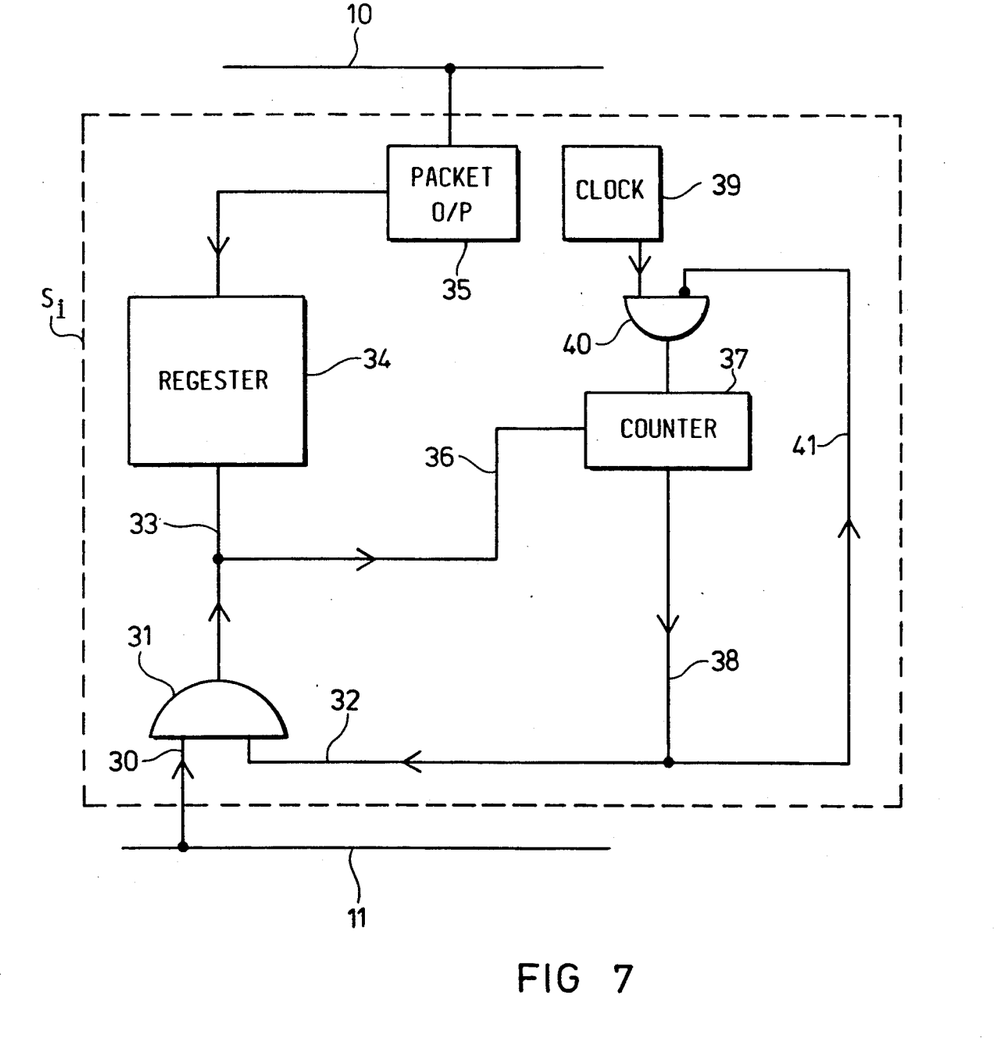
FIG. 7 shows a circuit for inhibiting cycle reset for use in an embodiment of the present invention.

The solution to this problem will now be described for station $S_i$ in FIG. 1, referring to the block diagram shown in FIG. 7. In that block diagram, only the parts of the station $S_i$ relevant to resetting are discussed, the other parts may be conventional as described in U.S. Pat. No. 4,532,626 which is incorporated herein by reference.

Consider the case where a frame reaches the station $S_i$ on line 11 in which the reset bit B' is set. This results in an input via line 30 to an AND logic gate 31. That logic gate 31 also has another input, line 32, but suppose at this stage that line is at logic 1. In this case, gate 31 sends a signal on line 33 to register 34 to reset that register to $P_{max}$. As data packets are output from output device 35 to the line 10 (written to frames in which the data field is empty when the frame reaches station $S_i$) a signal is sent from that output device 35 to the register 34 to cause that register 34 to decrement by 1. Register 34 thus keeps track of the remaining maximum number of data packets that may be transmitted in a station cycle; upon the register 34 being decremented to zero, the output device suspends operation until the register is reset at the start of the next station cycle.

It can be seen from FIG. 1 that when the gate 31 outputs a signal on line 33 to the register 34, that signal also passes on line 36 to a counter 37 and that counter is reset to a predetermined value. The counter 37 is arranged to generate an output on line 38 only when its count is zero, so that the resetting of the counter 37 by a signal on line 36 means that the signal on line 32 to the gate 31 is logic 0. Since gate 31 acts as an AND gate, a logic "0" signal on line 32 will mean that the gate 31 will not pass a signal from line 30 while that "0" level on line 32 remains. Thus, in this state, the register 34 is inhibited from being reset by a set reset bit B' of a frame on line 11.

The counter 37 is controlled by a clock 39 operating at the rate of transmission of frames down the line. The output of the clock 39 is sent to a gate 40 which also receives (at an inverting input) the signal on line 38 via line 41. Thus, when the value of the counter 37 is non-zero, there is a logic "0" signal on line 41 and thus the gate 40 will pass signals from the clock 39 to the counter 37. These signals from the clock 39 cause the counter 37 to decrement, and this decrementing will continue until the counter 37 reaches zero. Note that the counter cannot be reset by signal on line 36 during this decrementing process because line 36 will remain at a logic "0" value whenever there is a logic "0" signal on line 32, and that signal 32 is at logic "0" whenever the counter 37 is non-zero. At some point, the counter 37 will reach zero and then the signal on line 38 will change to logic "1". When this happens, the line 32 also changes to logic "1" and thus the gate 31 can pass reset signals received from line 11 via line 30 to the register 34 to reset that register to $P_{max}$. At the same time, line 41 changes to logic "1" so further signals from the clock 39 are blocked by the gate 40 from passing to the counter 37.

In this way, the action of the gate 31 and counter 37 inhibit reset signals being passed to the register 34 until the counter 37 has counted down to zero.

For the system described above in which there are twenty stations randomly placed along a line a hundred frame lengths long, a suitable predetermined value for the counter 37 is 25. Then, at least 25 frames must pass before the register 34 may be reset by a set reset bit on the line 11, and in practice this is sufficiently long to prevent any re-commencement of a cycle. Therefore, with this modification as shown in FIG. 7, the stations have a maximum cycle length determined entirely by $P_{max}$, and not by their spacing from other stations.

The present invention is particularly, but not exclusively, applicable to a system in which each station has a relatively large number of packets to transmit at any time, so that the transmission is controlled entirely by the value of $P_{max}$. It is possible, as in the prior art, to operate the system in a gated way, so that when the register 34 is set to $P_{max}$, only those packets which are currently stored in the station for transmission can be transmitted during the cycle. Alternatively, the system can be ungated so that if during a cycle, the station has further packets to transmit over and above those already stored at the station at the start of the cycle, then the station can transmit those further packets provided that the total number of packets does not exceed $P_{max}$. Normally, in either case, the number of packets that a station has to transmit will be much more than $P_{max}$, so that at any time all stations are "queued" with data to transmit. It is in this case, where data transmission is very busy down the lines, that the present invention gives its maximum benefit in maximizing the amount of transmission while at the same time achieving "fairness" between the stations so that one station does not excessively occupy the line, thereby delaying the transmission from other stations. Of course, the present invention may also be used where the number of packets that any station has to transmit at any time is small, in which case it is more likely that a given station will have transmitted all its packets in a cycle before $P_{max}$ is reached. In this case, the present invention offers a small amount of benefit over the existing systems, but nevertheless still offers the advantage of simplicity of signalling and hence simplicity and cost of stations.

The present invention is applicable to any system in which a plurality of stations are interconnected by a pair of signal paths. The system may extend over a long distance, e.g. 10 km and may have as many stations as is desired. $P_{max}$ may be set as appropriate and normal values will be between 8 and 32. The signal paths may use the same media.

What is claimed is:

1. A communications system comprising a plurality of stations ($S_1, S_2 \ldots S_N$) and two communication paths which are unidirectional and oppositely directed with respect to each other, each communication path coupled to each of said stations such that said stations are sequentially interconnected; each of such plurality of stations ($S_1, S_2 \ldots S_N$) comprising:

means to write data packets to one of said paths for transmission to downstream stations with that writing being in cycles of up to a predetermined maximum number of packets per cycle, a predetermined station further comprising means for detecting when all the stations ($S_1, S_2 \ldots S_N$) have completed their writing cycle and thereafter transmitting a reset signal from said predetermined station onto the other of said paths, said reset signal indicating that all of said stations have completed their writing cycle; and means to detect the reset signal and commence a further cycle of writing of packets on the basis of that reset signal.

2. A communications system according to claim 1, wherein each of the stations ($S_1, S_2 \ldots S_N$)) has means for temporarily inhibiting recommencement of a cycle by a reset signal on said other of the paths after commencement of a cycle by an earlier reset signal on said other of the paths.

3. A communications system according to claim 2, wherein each station ($S_1, S_2 \ldots S_N$) is arranged to write further data packets on the other of the paths, the writing of the further data packets being effected in a plurality of further cycles each of a further predetermined maximum number of the further packets, the predetermined station ($S_1, S_N$) being operative to generate a further reset signal on said one of the paths for re-initiating said further cycles.

4. A communications system according to claim 2, wherein the system is arranged to generate and transmit a succession of data frames along each of said paths to which data packets are written by said stations ($S_1, S_2 \ldots S_N$), each station being operative to write data packets to said frames for transmission along said path.

5. A communications system according to claim 4, wherein said means for temporarily inhibiting recommencement of a cycle is operative to inhibit recommencement for the duration of a predetermined number of said frames.

6. A communication system according to claim 4 on claim 3, wherein each of the said frames comprises a control field and a data field, each of the stations ($S_1, S_2 \ldots S_N$) being arranged to write a said data packet to said one path, or a said further packet to said other path, by writing to a corresponding one of the data fields, and to transmit said further reset signal on said one path, or said further reset signal on said other path, by writing to said control field.

7. A method for communicating data in a communications system, the system comprising a plurality of stations ($S_1, S_2 \ldots S_N$) sequentially interconnected by two signal paths with those paths being unidirectional and oppositely directed with respect to each other, the station ($S_N, S_1$) at the end of one of the paths being a tail station for that one path, said method comprising the following steps:

each station writing data packets to said one of the paths with said writing being in cycles of up to a predetermined maximum number of packets per cycle; and the tail station ($S_N, S_1$) for said one path detecting when all the stations ($S_1, S_2 \ldots S_N$) on said one path have completed their writing cycles and thereafter transmitting a reset signal on the other path; and each station ($S_1, S_2 \ldots S_N$) detecting the reset signal and commencing a further cycle of writing packets on the basis of the reset signal.

8. A method according to claim 7, wherein after commencement of a said cycle by a said reset signal on said other of the paths a further said reset signal on said other of the paths is temporarily inhibited from re-commencing a cycle.

9. A communications system having a plurality of stations interconnected via at least one signal path, each of said plurality of stations comprising means for writing data packets to and reading data packets from said signal path, said writing being effected in cycles of up to a predetermined maximum number of packets per cycle, the system characterized in that:
   a predetermined one of said stations comprises means for detecting when the said plurality of stations have completed a writing cycle and thereafter transmitting a reset signal onto said signal path, said reset signal indicating that said stations have completed a writing cycle; and
   the other of said stations comprise means for detecting said reset signal and, in response to said reset signal, commencing a further writing cycle.

10. The communications system recited in claim 9, wherein said at least one other station further comprises means for temporarily delaying commencement of a cycle in response to said reset signal.

11. The communications system recited in claim 10, wherein:
   said signal path comprises first and second unidirectional legs, said first leg carrying data in an opposite direction to said second leg;
   said predetermined one of said stations comprises means for detecting when the said plurality of stations have completed their writing cycle onto said first leg and thereafter transmitting a reset signal onto said second leg;
   a second predetermined one of said stations comprises means for detecting when the said plurality of stations have completed their writing cycle onto said second leg and thereafter transmitting a reset signal onto said first leg.

12. The communication system recited in claim 11, further comprising means for transmitting a succession of data frames along each of said legs, and means within each station for writing data packets to said frames for transmission along said path.

13. The communications system recited in claim 12, wherein said means for temporarily delaying a cycle comprises means for delaying commencement of a cycle for the duration of a predetermined number of said frames.

14. The communications system recited in claim 13, wherein each of the said frames comprises a control field and a data field, each data packet transmitted onto said signal path is written to a data field, and each reset signal is written to a control field.

15. A method for operating a communications system having a plurality of stations interconnected via at least one signal path, each of said plurality of stations comprising means for writing data packets to and reading data packets from said signal path, said writing effected in cycles of up to a predetermined maximum number of packets per cycle, the method characterized in that:
   a predetermined one of said stations detects when the said plurality of stations have completed their writing cycle and thereafter transmits a reset signal onto said signal path, said reset signal indicating that said stations have completed their writing cycle; and
   the other of said stations detect said reset signal and, in response to said reset signal, commence a further writing cycle.

16. The method recited in claim 15, further comprising the step of temporarily delaying commencement of a cycle in response to said reset signal.

17. The method recited in claim 16, wherein said signal path comprises first and second unidirectional legs, said first leg carrying data in an opposite direction to said second leg, and further comprising:
   said predetermined station detecting when the said plurality of stations have completed their writing cycle with respect to said first leg and thereafter transmitting a reset signal onto said second leg; and
   a second predetermined station detecting when the said plurality of stations have completed their writing cycle with respect to said second leg and thereafter transmitting a reset signal onto said first leg.

18. The method recited in claim 17, further comprising transmitting a succession of data frames along each of the legs, and writing data packets to said frames for transmission along said path.

19. The method recited in claim 18, wherein said step of temporarily delaying a cycle comprises delaying commencement of a cycle for the duration of a predetermined number of said frames.

20. The method recited in claim 19, wherein each of the said frames comprises a control field and a data field, each data packet is written to a data field, and each reset signal is written to a control field.

21. A method for operating a system of stations in communications with one another, comprising the steps of:
   (a) identifying a first station as an end station with respect to communications in a first direction;
   (b) initiating a first write cycle wherein at least each of said stations preceding said end station is permitted to transmit a predefined maximum amount of information in a first direction;
   (c) detecting when said write cycle has ended;
   (d) transmitting a reset signal from said first station to other stations in the system, said reset signal indicating that said first write cycle has ended; and
   (e) initiating a second write cycle after at least one of said other stations has received said reset signal.

* * * * *

UNITED STATES PATENT AND TRADEMARK OFFICE
CERTIFICATE OF CORRECTION

PATENT NO. : 5,111,456
DATED : May 5, 1992
INVENTOR(S) : John O. Limb

It is certified that error appears in the above-indentified patent and that said Letters Patent is hereby corrected as shown below:

In the Abstract, Line 4, change "111" to --11--.

Column 10, Line 41, after "4" change "on" to --or--.

Column 12, line 43, before "with" change " communications" to --communication--.

Signed and Sealed this

Nineteenth Day of December, 1995

Attest:

BRUCE LEHMAN

Attesting Officer  Commissioner of Patents and Trademarks